(12) United States Patent
Gove et al.

(10) Patent No.: US 9,043,510 B2
(45) Date of Patent: May 26, 2015

(54) HARDWARE STREAMING UNIT

(71) Applicant: Oracle International Corporation, Redwood City, CA (US)

(72) Inventors: Darryl J Gove, Sunnyvale, CA (US); David L Weaver, Emerald Hills, CA (US); Gerald Zuraski, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 19 days.

(21) Appl. No.: 13/960,235

(22) Filed: Aug. 6, 2013

(65) Prior Publication Data
US 2015/0046687 A1 Feb. 12, 2015

(51) Int. Cl.
G06F 13/28 (2006.01)
G06F 9/30 (2006.01)
G06F 13/00 (2006.01)

(52) U.S. Cl.
CPC .................. *G06F 9/30032* (2013.01)

(58) Field of Classification Search
None
See application file for complete search history.

(56) References Cited

U.S. PATENT DOCUMENTS

| | | | |
|---|---|---|---|
| 7,626,805 B2 | 12/2009 | Hall | |
| 8,499,091 B2 | 7/2013 | Roos | |
| 8,719,442 B2 | 5/2014 | Lee | |
| 2013/0318306 A1* | 11/2013 | Gonion | ........................ 711/137 |

FOREIGN PATENT DOCUMENTS

WO  2004-003767  1/2004

OTHER PUBLICATIONS

International Search Report and Written Opinion in International Application No. PCT/US2014/049954 mailed Dec. 16, 2014.

* cited by examiner

*Primary Examiner* — Scott Sun
(74) *Attorney, Agent, or Firm* — Meyertons Hood Kivlin Kowert & Goetzel; Erik A. Heter

(57) ABSTRACT

A processor having a streaming unit is disclosed. In one embodiment, a processor includes one or more execution units configured to execute instructions of a processor instruction set. The processor further includes a streaming unit configured to execute a first instruction of the processor instruction set, wherein executing the first instruction comprises the streaming unit loading a first data stream from a memory of a computer system responsive to execution of a first instruction. The first data stream comprises a plurality of data elements. The first instruction includes a first argument indicating a starting address of the first stream, a second argument indicating a stride between the data elements, and a third argument indicative of an ending address of the stream. The streaming unit is configured to output a second data stream corresponding to the first data stream.

20 Claims, 18 Drawing Sheets

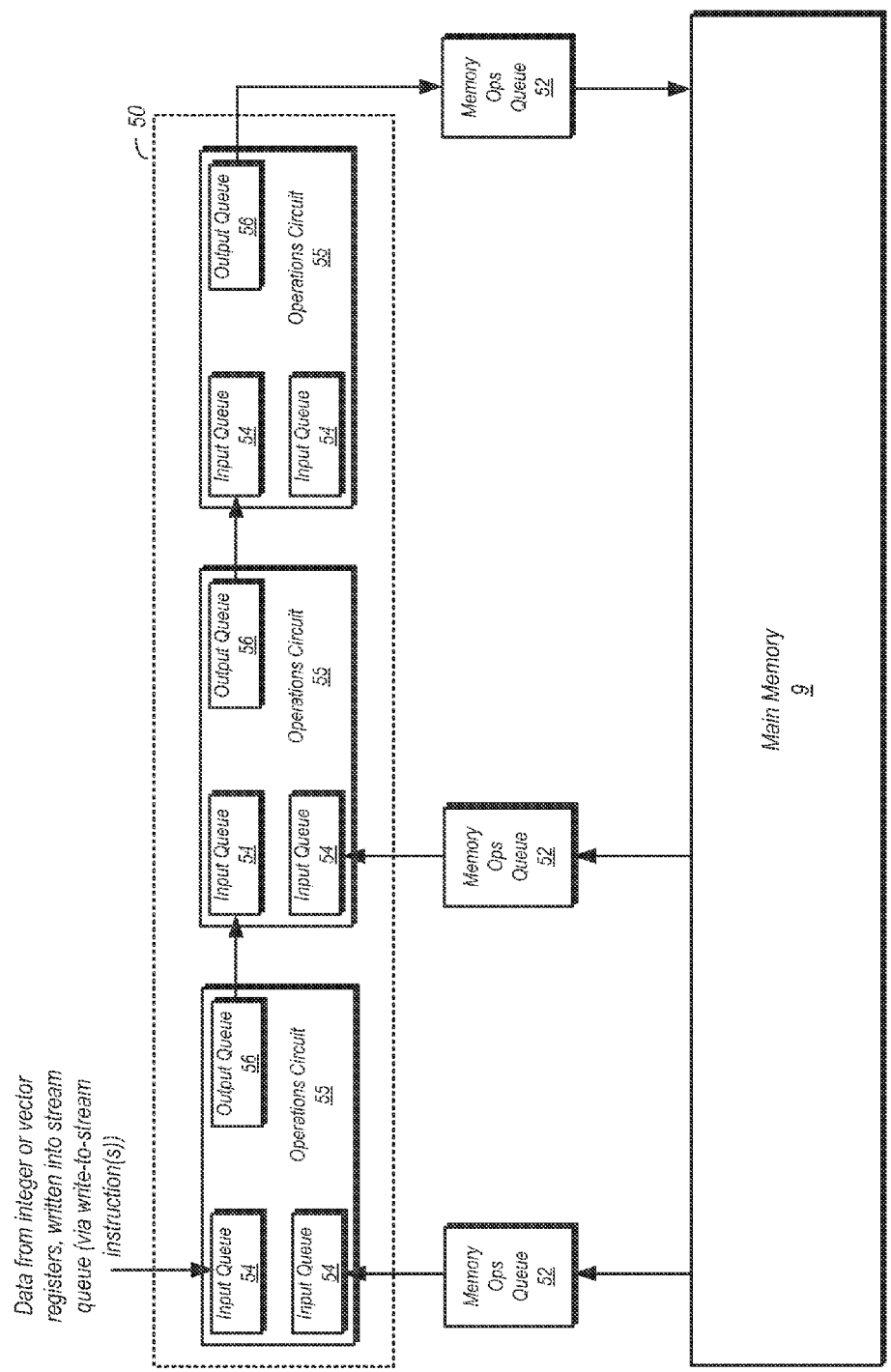

HARDWARE STREAMING UNIT

BACKGROUND

1. Technical Field

This disclosure relates to processors, and more particularly, hardware directed to the handling of streaming data.

2. Description of the Related Art

Many applications performed by computer system involve the use of streaming data. Streaming data is data obtained from memory at some regular address interval. Certain operations may be performed on all of the data from the data stream. For example, data of a data stream may be obtained from a contiguous group of memory addresses, beginning with a specified memory address, and continuing until all of the data in the group of addresses has been obtained. Alternatively, data of a data stream may be obtained beginning with a certain address, with additional blocks of data being obtained at equal address intervals from one another (sometimes referred to as a 'stride'). The data obtained from the stream may then undergo some form of processing. In many cases, the same operation may be performed on each block of data from the stream.

Many modern processors include a load/store unit which may execute instructions to fetch data from memory or write data to memory. For streaming data, the load/store unit may receive a series of instructions to read data from memory, with one instruction per data element to be read. As data elements are read from memory by the load/store unit, they may be passed either to registers to be used as operands in subsequent operations, or directly to execution units which may then perform operations on the elements of the data stream. Thereafter, data may be returned to the load/store unit and subsequently written back to memory.

SUMMARY OF THE DISCLOSURE

A processor having a streaming unit is disclosed. In one embodiment, a processor includes one or more execution units configured to execute instructions of a processor instruction set. The processor further includes a streaming unit configured to execute a first instruction of the processor instruction set, wherein executing the first instruction comprises the streaming unit loading a first data stream from a memory of a computer system responsive to execution of a first instruction. The first data stream comprises a plurality of data elements. The first instruction includes a first argument indicating a starting address of the first stream, a second argument indicating a stride between the data elements, and a third argument indicative of an ending address of the stream. The streaming unit is configured to output a second data stream corresponding to the first data stream.

In one embodiment, a method includes loading a first data stream from a memory of a computer system responsive to execution of a first instruction by a streaming unit in a processor of the computer system. The first instruction includes a first argument indicating a starting address of the first stream, a second argument indicating a stride between the data elements, and a third argument indicative of an ending address of the stream. The method further includes outputting a second data stream from the streaming unit, the second data stream corresponding to the first data stream.

BRIEF DESCRIPTION OF THE DRAWINGS

Other aspects of the disclosure will become apparent upon reading the following detailed description and upon reference to the accompanying drawings, which are now described as follows.

FIGS. 6A-6F are block diagrams illustrating various programmable configurations of the streaming unit embodiment of FIG. 5.

Figure 1:
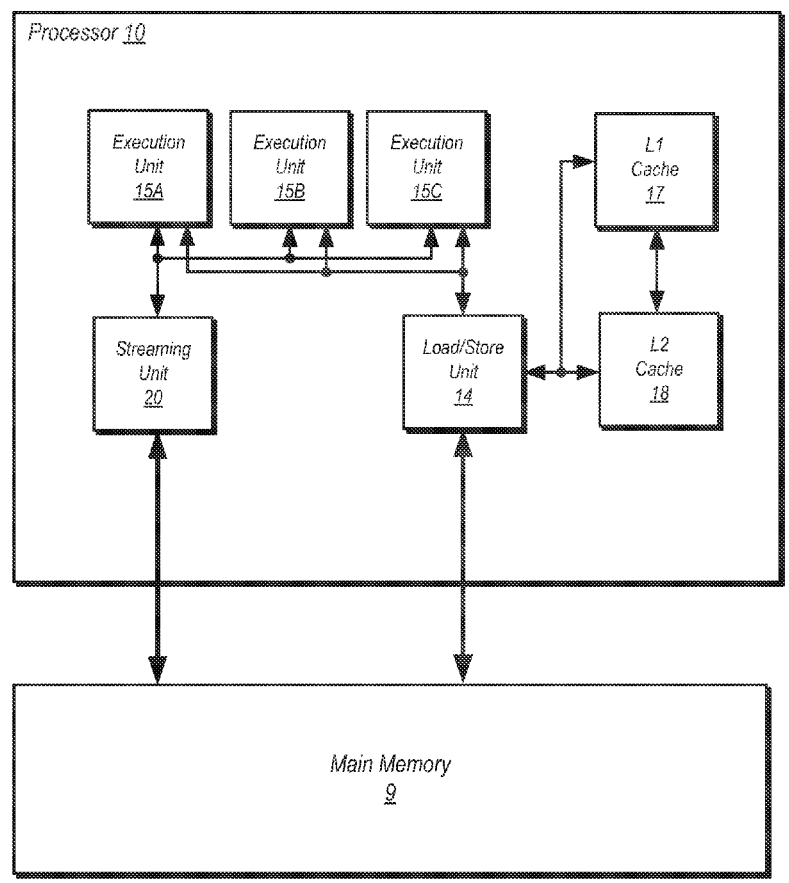
FIG. 1 is a block diagram of one embodiment of a processor.

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims.

DETAILED DESCRIPTION

FIG. 1 is a block diagram of one embodiment of a computer system including one embodiment of a processor. In the embodiment shown, computer system 5 includes a processor 10 coupled to a main memory 9. Computer system 5 may include other components that are not shown here for the sake of simplicity.

Memory 9 in the embodiment shown is a random access memory (RAM), which may be implemented as any one of a number of different types, including dynamic RAM (DRAM) and static RAM (SRAM). Embodiments are possible and contemplated in which main memory 9 may be implemented using memory technologies not explicitly discussed herein.

Processor 10 in the embodiment shown is a superscalar processor having a number of different execution units. In this particular embodiment, processor 10 includes execution units 15A, 15B, and 15C. In some embodiments, these units may be functionally identical, while in other embodiments these units may be functionally different from one another. For example, in one embodiment, execution unit 15A may be an integer unit, execution unit 15B may be a floating point unit, and execution unit 15C may be a fixed point unit.

It is further noted that while processor 10 is shown here as a superscalar processor, other embodiments falling within the scope of this disclosure are not limited to a superscalar architecture. For example, in one embodiment, processor 10 may be a vector processor. Furthermore, multi-core embodiments, each having one or more execution units implemented therein, are also possible and contemplated.

In addition to the execution units 15A-15C, processor 10 includes a load/store unit 14, which may be used to load data from memory and store data back to memory for some memory transactions. Load/store unit 14 may load data from memory responsive to execution of a load instruction. Similarly, data may be stored back to memory responsive to load/store unit 14 executing a store instruction. In the embodiment shown, load/store unit 14 is coupled to a cache subsystem that includes L1 cache 17 and L2 cache 18. In conjunction with load and store operations, load/store unit 14 may effect reads from and writes to one or both of these cache memories such that cache coherency is maintained. Load/store unit 14 may also write modified data from one or both caches back to memory in the event of a cache flush.

It is noted that while the cache subsystem shown here includes only caches 17 and 18, embodiments that include additional caches and/or other components are possible and contemplated. For example, a cache subsystem in some embodiments may include a cache controller as well as one or more additional levels of cache memory. Furthermore, embodiments are possible and contemplated wherein some cache memories, e.g., the L1 cache, are separated into two caches, one for storing instructions and one for storing data.

Processor 10 also includes a streaming unit 20 coupled between the execution units 15A-15C and main memory 9. Streaming unit 20 is also used to load data from memory and store data to memory. However, unlike load/store unit 14, streaming unit 20 is dedicated to loading streams of data. A data stream may be defined herein as a sequence of data elements that is contiguous, in which the data elements are spaced at regular intervals, or loaded from addresses on an address list (wherein the addresses are not necessarily contiguous or equally spaced). For example, a data stream may be a sequence of data elements in which each successive element is five addresses away from the previous data element. A special case of the data stream definition may include a contiguous block of data in memory, wherein each successive element is at the next address relative to the previous data element. A data stream may be further defined by parameters of the data stream, including a start address, an element size, a stride interval (which can be one, e.g., for a contiguous block of data) and an ending address. It is noted that a data element of a data stream may include data that consumes the entirety of a single address, a portion of a single address, or multiple addresses. Data streams may be used in a wide variety of applications, such as database searches, communications, and so on.

In one embodiment, the instruction set of processor 10 may include instructions explicitly intended for execution by streaming unit 20 for loading and/or storing data streams. For example, streaming unit 20 in the embodiment shown may execute an instruction to load a data stream from main memory. The instruction may include a number of arguments. A first argument may indicate the beginning address of the data stream. A second argument may indicate a stride (or spacing) between elements of the data stream. If the data stream is contiguous, then the second argument may indicate that the stride is one. In embodiments where the streaming unit always operates on contiguous data streams, no stride argument may be necessary. A third argument may be indicative of an ending address of the data stream. The third argument may, in one embodiment, may explicitly state the ending address of the stream. In another embodiment, the third argument may indicate the length of the stream or number of data elements to be loaded, which when combines with the stride in the second argument, implicitly indicates the ending address of the stream. Arguments indicating the size of each data element of the stream as well as a destination of an output stream may also be included. Additional arguments that may be provided with the instructions for the streaming unit may include arguments indicating how the loaded data stream is to be processed within certain embodiments of the streaming unit. In some embodiments, streaming unit 20 may receive input data streams from software, e.g., such as data generated during the execution of certain instructions in a software program. Correspondingly, embodiments are also possible and contemplated in which output data streams are provided to software and consumed thereby, without individual elements thereof being stored indefinitely into a memory.

Responsive to loading a first data stream, streaming unit 20 may output a second data stream corresponding thereto. In some embodiments, the destination of the second data stream may be indicated by a fourth argument presented with the instruction noted above. The fourth argument may indicate that the second data stream is to be written back to memory, output to a selected one or more of the execution units 15A-15C, or provided to another destination. The second data stream may also be defined by the other arguments discussed above.

The second data stream may take various forms. For example, if streaming unit is conducting a move or copy operation, the data of the second data stream may be identical to the data of first, with the first and second data streams being stored in different locations. Streaming unit 20 in some embodiments may also produce the second data stream by transforming the first. For example, the data of the first data stream may be encrypted data, while the data of the second stream may be data that is the decrypted equivalent of the first stream, with the decryption being performed internally to streaming unit 20. Logical operations may also be performed on incoming data streams in some embodiments of streaming unit 20. For example, some embodiments of streaming unit 20 may include logic circuitry that can perform various operations on the data of the first data stream, such as adding, shifting, comparing, and so forth. The data of the second data stream may thus be produced as a result of the logic operations performed on the first.

As noted above, load/store unit 14 is coupled to a cache subsystem and may operate in conjunction therewith. On the other hand, streaming unit 20 in the embodiment shown may operate independently of the cache subsystem. Thus, data elements loaded by this embodiment of streaming unit 20 are not necessarily cached upon being loaded from memory. This may reduce cache pollution and thus allow for more efficient operation of the cache subsystem. In some cases, data may be loaded from a cache by streaming unit 20, and in some cases data output from streaming unit 20 may be written into a cache. Nevertheless, streaming unit 20 may also include the capability to perform operations independently of a cache subsystem such as the one illustrated here.

While the discussion above has focused on inputting and outputting single data streams, various embodiments of streaming unit 20 may be configured to simultaneously or concurrently load multiple data streams from memory, simultaneously or concurrently output multiple data streams, and/or simultaneously or concurrently write multiple data streams to memory.

Figure 2:
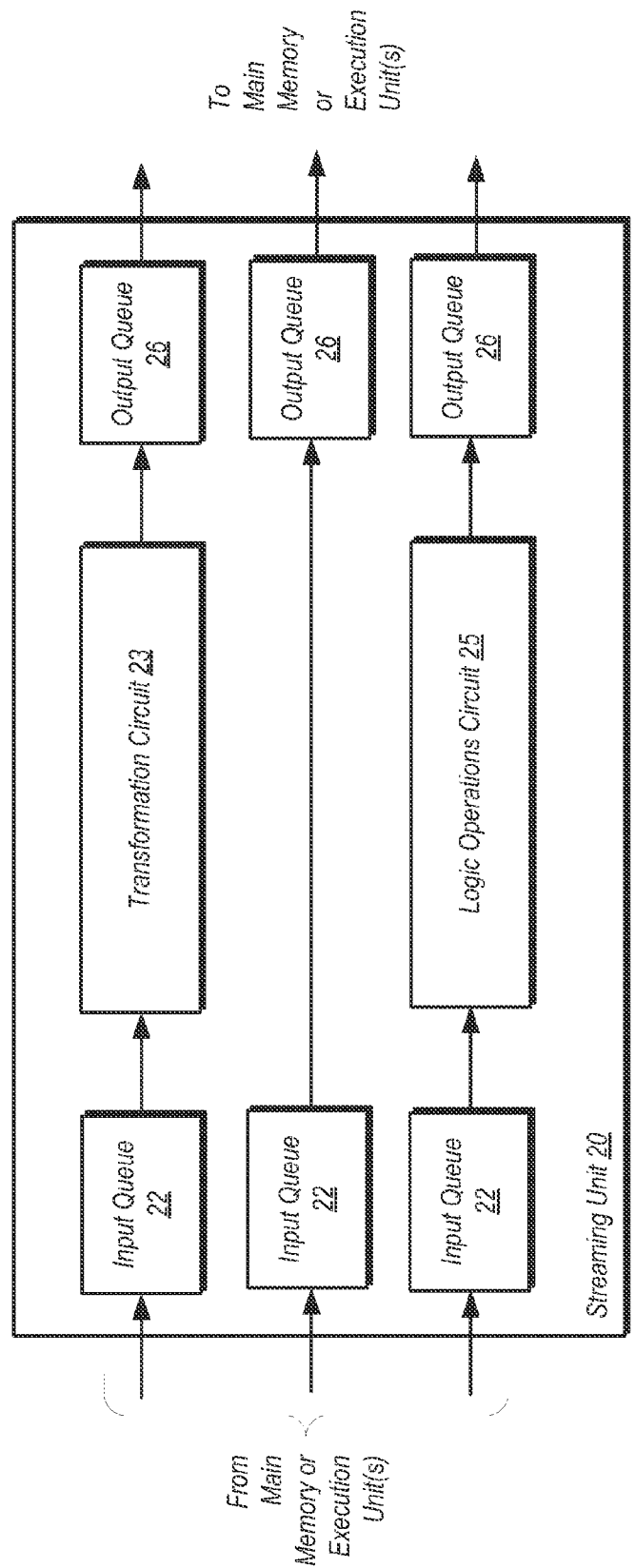
FIG. 2 is a block diagram of one embodiment of a streaming unit.

Turning now to FIG. 2, a block diagram of one embodiment of a streaming unit is illustrated. In the embodiment shown, streaming unit 20 includes three input queues 22 and three output queues 26. Data elements of data streams loaded from memory (or execution units) may be initially placed a selected one of input queues 22. Similarly, data elements of data streams to be output by streaming unit 20 may be temporarily stored in a selected one of output queues 26 prior to being output to their intended destination. It is noted that the input queues 22 and output queues 26 may be implemented as first-in, first-out (FIFO) memories in one embodiment, although other embodiments are not limited to using FIFOs.

In the embodiment shown, streaming unit 20 includes a transformation circuit 23 and a logic operations circuit 25. It is noted that the number of input and output queues, transformation circuits, and logic operations circuit shown here is exemplary, and may vary from one embodiment to the next. Furthermore, some embodiments of streaming unit 20 may be implemented without a transformation circuit 23 or a logic operations circuit 25. Embodiments in which the functionality of transformation circuit 23 and logic operations circuit 25 are combined into a single unit are also possible and contemplated.

Transformation circuit 23 in the embodiment shown may be configured to perform one or more various transformations on a data stream received via its respectively coupled input queue 22. For example, transformation circuit 23 may be configured to decrypt encrypted data, compress data, decompress data, and so forth. In some embodiments, transformation circuit 23 may have a singular function. In other embodiments, transformation circuit 23 may be configurable to perform a particular one of a number of different possible functions, which may be changed according to software programming or other inputs. The transformed data may be conveyed to output queue 26 and eventually to its intended destination.

Logic operations circuit 25 in the embodiment shown may perform logic operations on data elements received from its respectively coupled one of input queues 22. Logic operations that may be performed include various arithmetic operations, shift operations, compare operations, and so forth. The results of such operations may be conveyed to the correspondingly coupled output queue 26 and then output to the intended destination.

It is noted that one of the input queues 22 in the embodiment shown is coupled directly to a corresponding output queue 26. This configuration may be used for various operations, such as move and copy operations, as well as for operations in which a data stream loaded from memory it to be provided to one or more of the execution units without being altered.

As previously noted, one possible destination for data streams output from streaming unit 22 is main memory. In general, streaming unit 20 may output data streams to any selected and appropriately coupled destination. Accordingly, streaming unit 20 may perform some operations on data streams, such as the above-mentioned transformation and logic operations, independent of the execution units. This may reduce the workload of the execution units or allow them to perform other operations while streaming unit 20 performs the desired operations on the data streams. This may also allow streaming unit 20 to perform some pre-processing of data streams that are to be operated on by the execution units, also reducing the overall workload of the latter. Overall, the ability of streaming unit 20 to operate independently of the execution units and the cache subsystem may lead to more efficient processor operation.

Figure 3:
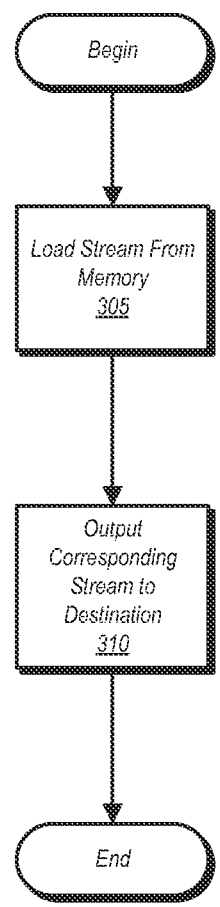
FIG. 3 is a flow diagram illustrating one embodiment of a method for operating a streaming unit in a processor.

FIG. 3 is a flow diagram illustrating one embodiment of a method for operating a streaming unit in a processor. In the embodiment shown, method 300 includes a streamlining unit loading a data stream from memory (block 305). The memory stream may be one of a number of data streams that are concurrently loaded by the streaming unit. Method 300 further includes outputting a corresponding data stream from the streaming unit to an intended destination (block 310). The corresponding data stream may be identical to the originally loaded data stream, may be a transformed version of the originally loaded data stream, or may be a new data stream generated by performing operations on the originally loaded data stream. The intended destination may be back to memory, to an execution unit, or to another destination.

Figure 4:
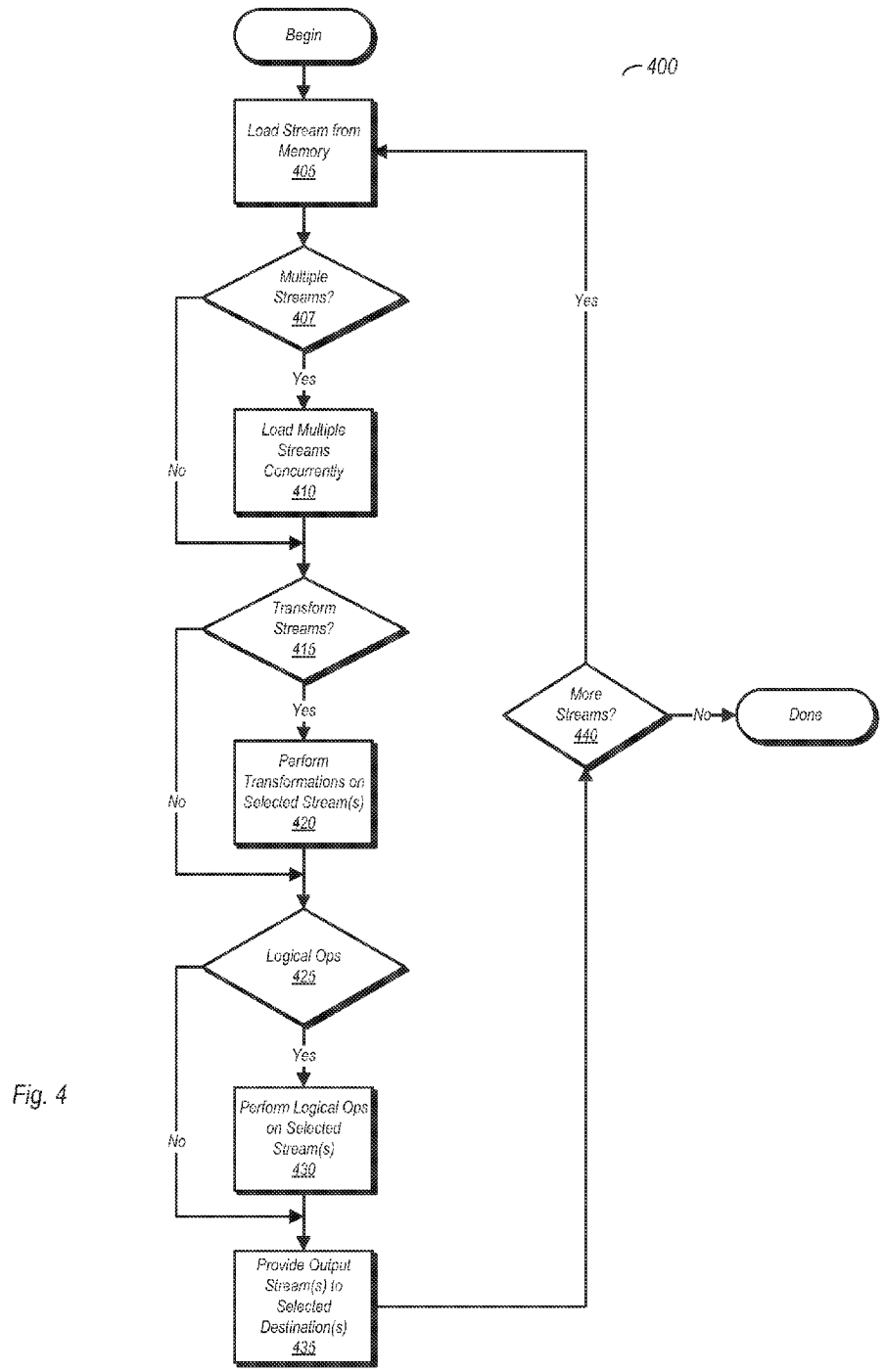
FIG. 4 is a flow diagram illustrating another embodiment of a method for operating a streaming unit in a processor.

FIG. 4 is a flow diagram illustrating another embodiment of a method for operating a streaming unit in a processor. Method 400 begins with the loading of a data stream from memory (block 405). If the data stream is one of multiple streams to be loaded from memory (block 407, yes), then the multiple streams may be loaded concurrently (block 410). Otherwise (block 407, no), only the single data stream is loaded and the method progresses to the next block.

In some cases, some of the one or more data streams may be intended for transformation. If a data stream is to be transformed (block 415, yes), then the streaming unit will perform the transformations on the selected data streams (block 420). As noted above, such transformations may include (but are not limited to) encryption, decryption, compression, decompression, and so on. If a data stream is not intended for transformation (block 415, no), method 400 progresses to block 425.

Some data streams may be intended to have logical operations performed thereon (block 425, yes). For such selected data streams, the logical operations may be performed by the streaming unit (block 430). The logical operations may include (but are not limited to) searching a data stream for specified data, arithmetic operations, logical shifts, or any other logical operation that can be performed on data streams and/or individual elements thereof. For selected streams for which no logical operation is to be performed (block 425, no), method 400 progresses to block 435.

The streaming unit may provide output data streams based on the received input data streams, to selected destinations (block 435). An output stream may be identical to an input data stream, a transformed version of an input data stream, or a newly generated data stream based on logical operations performed on an input data stream. The selected destination for a given data stream may be one or more execution units, to be stored back to memory, or another destination (e.g., registers, etc.). If there are additional data streams to be processed (block 440, yes), the method proceeds back to block 405. Otherwise, method 400 is complete until further stream operations are to be conducted.

Figure 5:
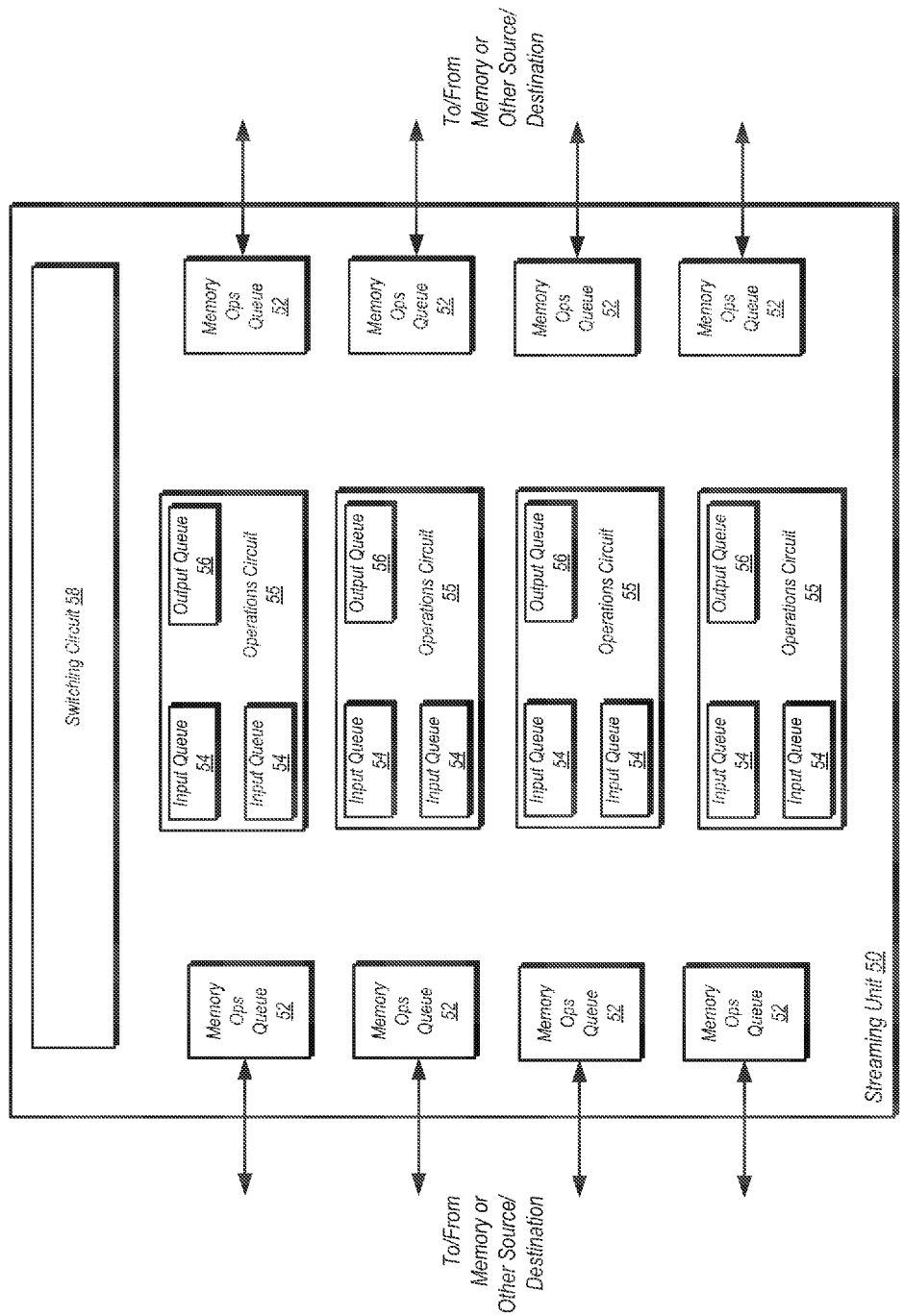
FIG. 5 is a block diagram of another embodiment of a streaming unit.

FIG. 5 is a block diagram of another embodiment of a streaming unit. In the embodiment shown, streaming unit 50 includes a configurable internal network including various agents. Among the agents included are a number of memory operations queues 52 and a number of operations circuits 55. A switching circuit 58 may be coupled to each of the agents (it is noted that the coupling is not shown here for the sake of simplicity). Switching circuit 58 may in turn couple selected ones of the agents to one another to configure streaming unit 50 for performing various operations. Software programming from an external source may be applied to switching circuit 58 in order to determine the configuration for a particular operation to be performed.

It is noted that the number of agents shown in FIG. 5 is exemplary. However, other embodiments may include a greater or lesser number of each of the agent types shown therein, and thus FIG. 5 is not intended to limit the scope of this disclosure.

Each of the memory operations queues 52 may be coupled to a main memory such as main memory 9 illustrated in FIG. 1 above. In some embodiments, memory ops queues 52 may include separate queues for receiving input streams from memory and providing output streams to memory or other destinations. In another embodiment, each of the memory operations queues 52 may serve as an input queue or an output queue. In general, the memory operations queues may be used for performing memory operations and for interfacing streaming unit 50 to other units, such as execution units or system memories. Each of memory operations queues 52 may be implemented as a FIFO in the embodiment shown.

Operations circuit 55 in the embodiment shown are configured to perform various operations on data streams. The operations performed by operations circuits 55 may include any of the transformation or logical operations discussed above, as well as operations not explicitly discussed herein. In some embodiment, each of the operations circuit 55 may be configured for dedicated use, i.e., may be configured to perform a single type of operation. However, other embodiments are possible and contemplated where each operations circuit 55 may perform more than one type of operation, and may be programmable or otherwise configurable by software or other means when streaming unit 50 is being set up to perform an operation or set of operations.

In the embodiment shown, each of operations circuits 55 includes two input queues 54 and one output queue 56, although the number of the input and output queues may vary from one embodiment to another. During operations, one or both input queues 54 of an operations circuit may be coupled to a memory operations queue 52 that are in turn receiving data streams from memory or other data source. The output queue 56 in each operations circuit 55 may be coupled to another memory operations queue 52 that is providing an output stream to a selected destination. Thus, the flow of data through streaming unit 50 in the embodiment shown is from memory to one or more memory ops queues 52, then to input queues 54 of selected operations circuit 55 which conveys/generates an output data stream and writes it to output queue 56, then to another memory operations queue 52 and finally to its intended destination.

Switching circuit 58 may be implemented in various ways. In one embodiment, switching circuit 58 may be implemented as a crossbar configured to couple any selected agent to any other selected agent. In another embodiment, the switches that comprise switching circuit 58 may be distributed throughout streaming unit 50, and may couple selected agents to other selected agents. In general, switching circuit 58 may be implemented in any manner suitable to allow configuring of the internal network in various arrangements to perform the desired operations. The particular arrangement of streaming unit 50 for a particular operation or set of operations may be programmed, by software, into switching circuit 58. Responsive to being programmed, switching circuit 58 may couple the various agents of streaming unit 50 to one another in order the enable the desired operation to be performed. The programming may be performed using at least one instruction, such as that discussed above with respect to the embodiment of streaming unit 20 discussed above. In particular, an instruction having a number of different arguments may be provided to streaming unit 50. In addition to those arguments discussed above, the instructions may also include arguments indicating which operations are to be performed and in which order. Switching circuit 58 may configure streaming unit 50 to perform the indicated operations in the indicated order.

FIGS. 6A-6F are block diagrams illustrating various programmable configurations of the streaming unit embodiment of FIG. 5. It is noted that only the units directly involved in the operations are shown in these various examples for the sake of simplicity. Other units in the streaming unit 50 may be performing other operations concurrently with the operations shown in these various drawings. It is further noted that while switching circuit 58 is not shown for the sake of simplicity, it is nonetheless present and the coupling of the units shown is assumed to have been performed thereby.

Figure 6A:
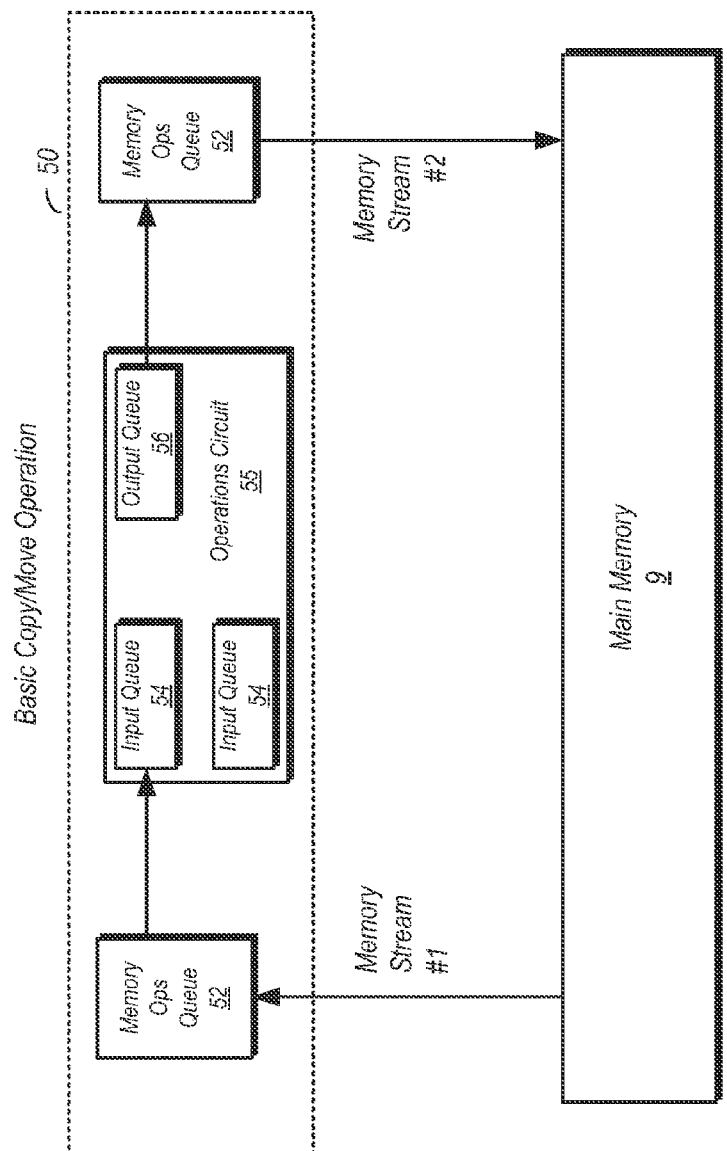

FIG. 6A illustrates a configuration for performing a simple move or copy operation using an embodiment of streaming unit 50. An input data stream, Memory Stream #1, may be loaded by streaming unit 50 into a first memory operations queue 52. From memory ops queue 52, the input data stream is then conveyed to a first input queue 54 of operations circuit 55. Since the operation is a move or copy operation, the data stream is not transformed, and is thus conveyed as is to output queue 56. From output queue 56, the data stream is conveyed to another memory operations queue 52. Thereafter, the data stream is conveyed to a new location in main memory 9.

Figure 6B:
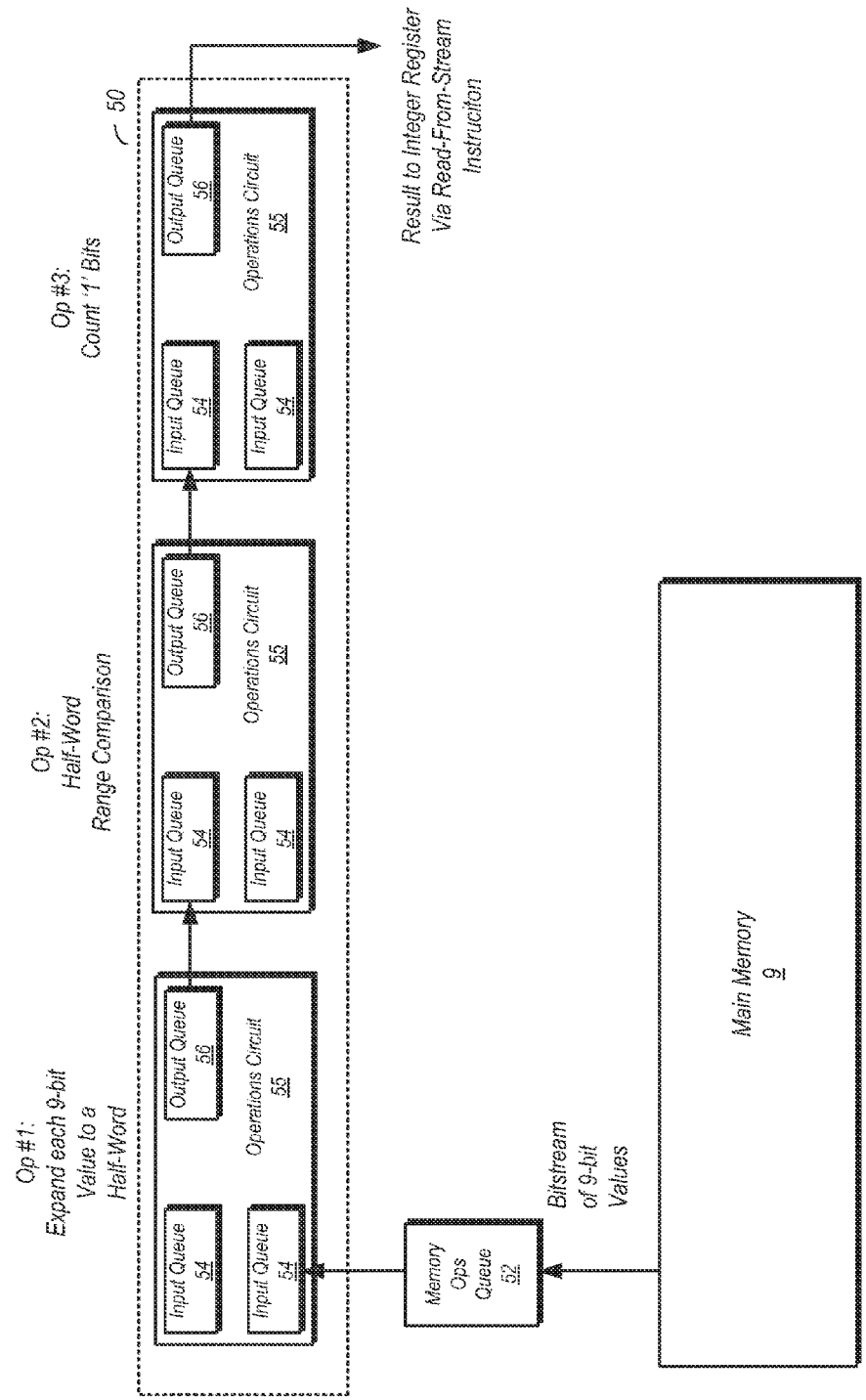

FIG. 6B illustrated another operation involving three operations circuits coupled together in a series configuration. A data stream of 9-bit values is loaded from main memory 9 into a memory operations queue 52, and then into input queue 54 of a first operations circuit 55. The first operations circuit 55 performs an expansion of each individual element of the data stream from 9 bits to 16 bits, the latter of which constitutes a half-word in this particular embodiment. After expansion, the elements of the data stream are passed to output queue 56 of the first operations circuit 55 and then to an input queue 54 of a second operations circuit 55. In the second operations circuit 55, each half-word is subject to a range comparison. For each comparison that is within the specified range, a '1' is recorded, otherwise a '0' is recorded. A bitstream of the comparison results is then provided to output queue 56 and subsequently forwarded to an input queue 54 of a third operations circuit 55. In the third operations circuit 55, the number of '1' s are counted, with the final count value being written to output queue 56. Thereafter, the count value is written to an integer register via a 'Read-From-Stream' instruction.

Figure 6C:
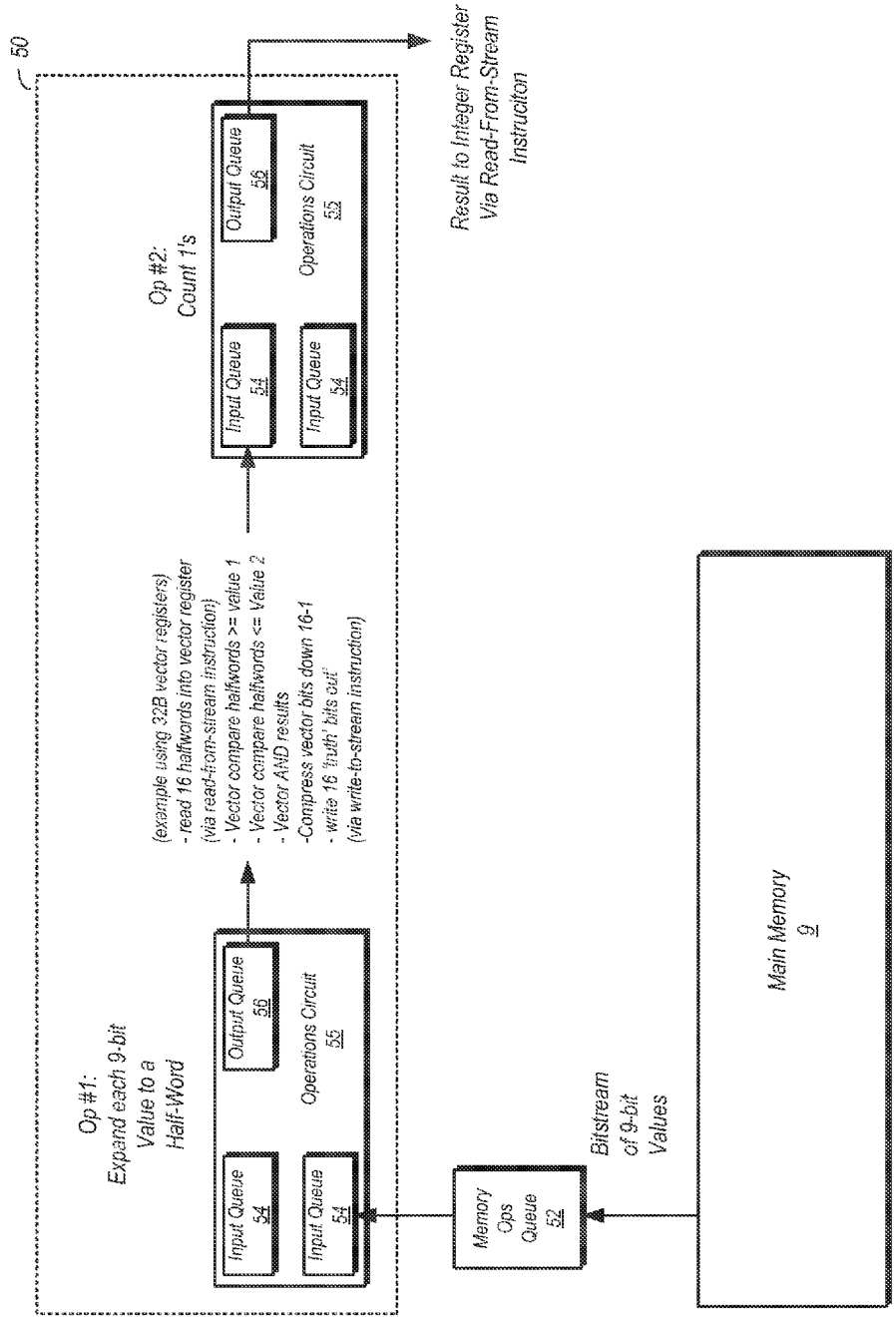

Turning now to FIG. 6C, an operation utilizing streaming unit 50 and vector registers is shown. In the example shown, streaming unit 50 loads a stream of 9-bit values from main memory to memory operations queue 52 and subsequently to an input queue 54 of a first operations circuit 55. In the first operations circuit 55, each 9-bit value is expanded to 16 bits, which constitutes a half-word in this embodiment. Thereafter, the 16-bit values are conveyed to vector registers via the output queue 56, using a read-from-stream instruction. These values are then compared to a first value and a second value, and the comparison results are ANDed together. Thereafter, the vector bits are compressed down at a 16-1 ratio, and values of 16 'truth' bits are written from the register to the input queue 54 of a second operations circuit 55 responsive to a 'Write to Stream' instruction. The second operations circuit may then count the number of 1's in the received value and output, through output queue 56, the count value responsive to a 'Read from Stream' instruction.

In the arrangement of FIG. 6D, three operations circuits 55 are coupled in series. The first operations circuit 55 is coupled to receive a data stream from main memory 9, via a memory operations queue 52, into a first input queue 54. A second input queue 54 of the first operations circuit 55 received data from integer or vector registers written therein via one or more 'Write to Stream' instructions. A first operation is performed using the data from both input queues 54, which is then written to an output queue 56. The output queue 56 of the first operations circuit 55 conveys data to a first input queue 54 of the second operations circuit 55. A second input queue 54 of the second operations circuit 55 receives another data stream, via a memory operations queue 52, from main memory 9. The second operation circuit 55 then performs a second operation using the data from each of its input queues 54, with results being written to its respective output queue 56. From there, the data is conveyed to an input queue 54 of a third operations circuit 55, where a third operation is performed. The resulting output stream is then output from the output queue 56 of the third operations circuit 55 to a memory operations queue 52 and then to main memory 9.

Figure 6E:
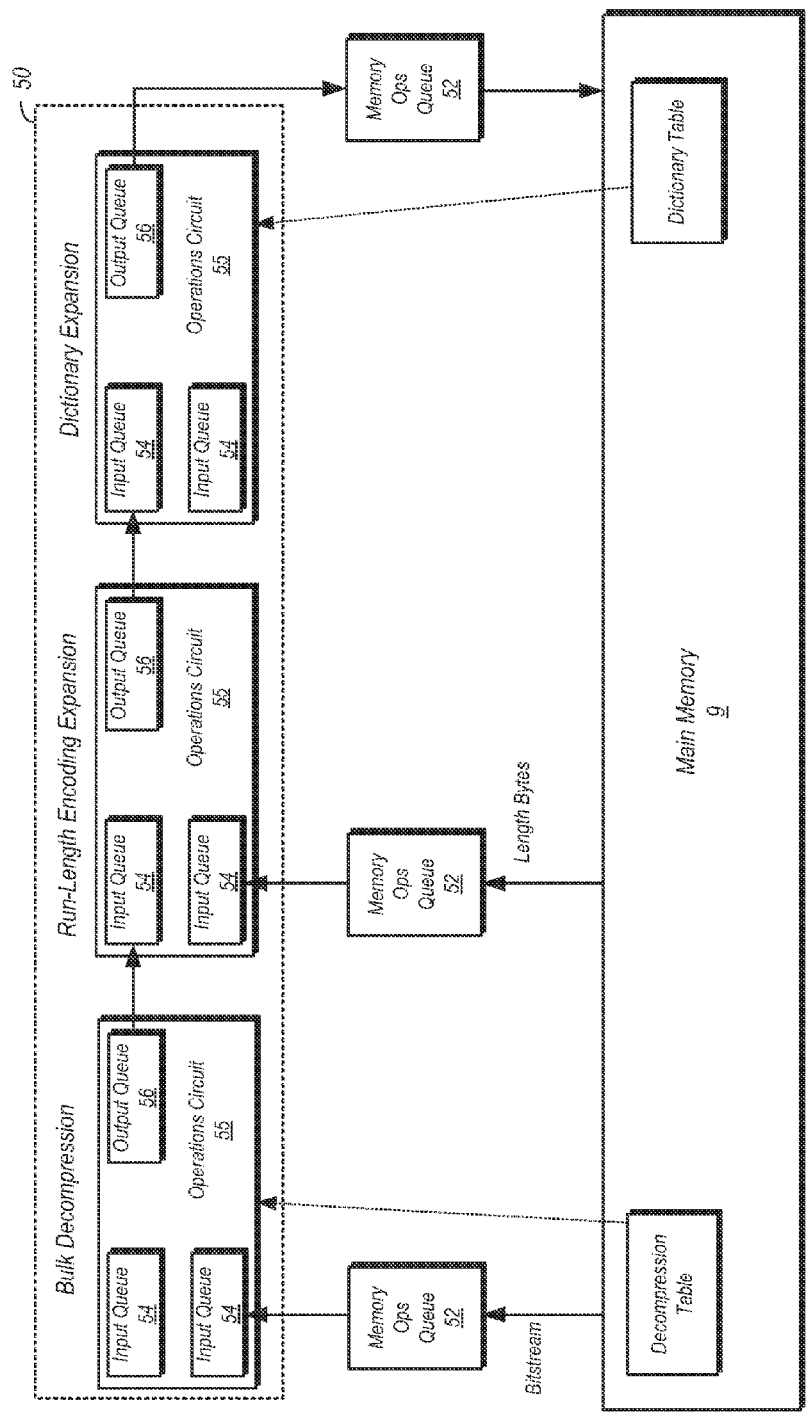

FIG. 6E illustrates another example utilizing three series-coupled operations circuits 55. In the first operations circuit 55, bulk decompression is performed on a bitstream of data received from main memory 9 (using a decompression table also received from main memory 9). The second operations circuit 55 receives a first stream from the first operations circuit 55 and a second data stream from main memory 9 via a memory operations queue 52. Using the two data streams, the second operations circuit 55 performs a run-length encoding operation. The resulting data stream is then forwarded to the third operations circuit 55, where a dictionary expansion operation is performed, using a dictionary table that may be accessed from main memory 9. Thereafter, the resulting data stream is written to main memory 9 via a memory operations queue 52.

Figure 6F:
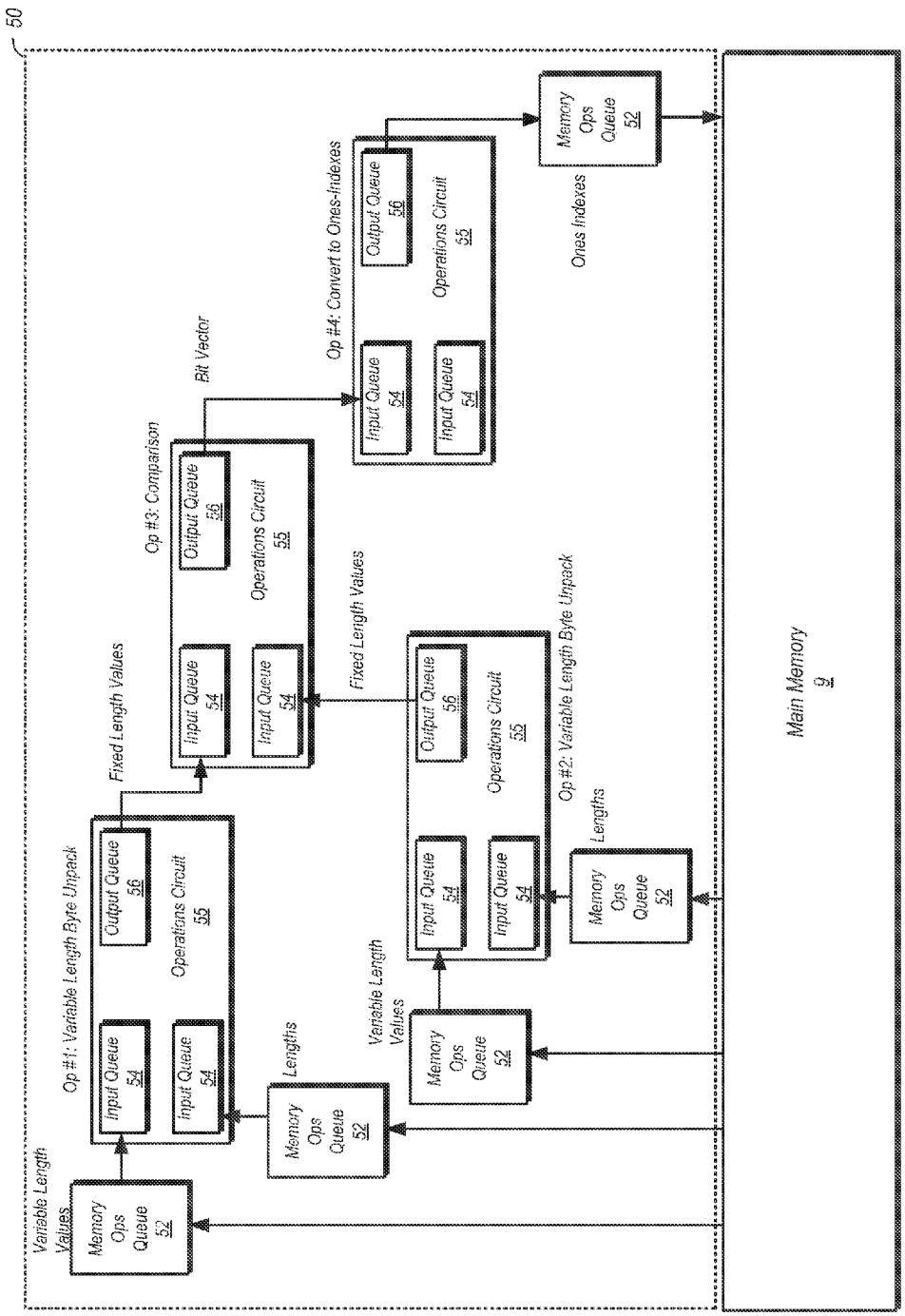

FIG. 6F illustrates an example utilizing operations circuits coupled in a series-parallel combination. In the example shown, four data streams are concurrently loaded into two different operations circuits 55 operating in parallel. Two of the input data streams comprise variable length values, while the other two input data streams comprise values indicating lengths. Each of the two parallel-configured operations circuits 55 is configured to receive one stream of variable length values and one stream of values indicating lengths. The two parallel-configured operations circuit 55 each perform a variable-length byte unpacking operation, and output fixed-length values to a third operations circuit 55. The third operations circuit 55 performs a comparison operation using the two streams and outputs a bit vector to the fourth operations circuit. In the fourth operations circuit 55, the bit vector is converted to ones-indexes, with the resulting stream being written back to main memory 9.

The configurations discussed above in conjunction with FIGS. 6A-6F are exemplary, and various embodiments of streaming unit are by no means limited to only these configurations. In contrast, by programming the switching circuit 58 to configure the internal network of streaming unit 50 in various ways, a large number of different configurations are possible and contemplated.

Figure 7:
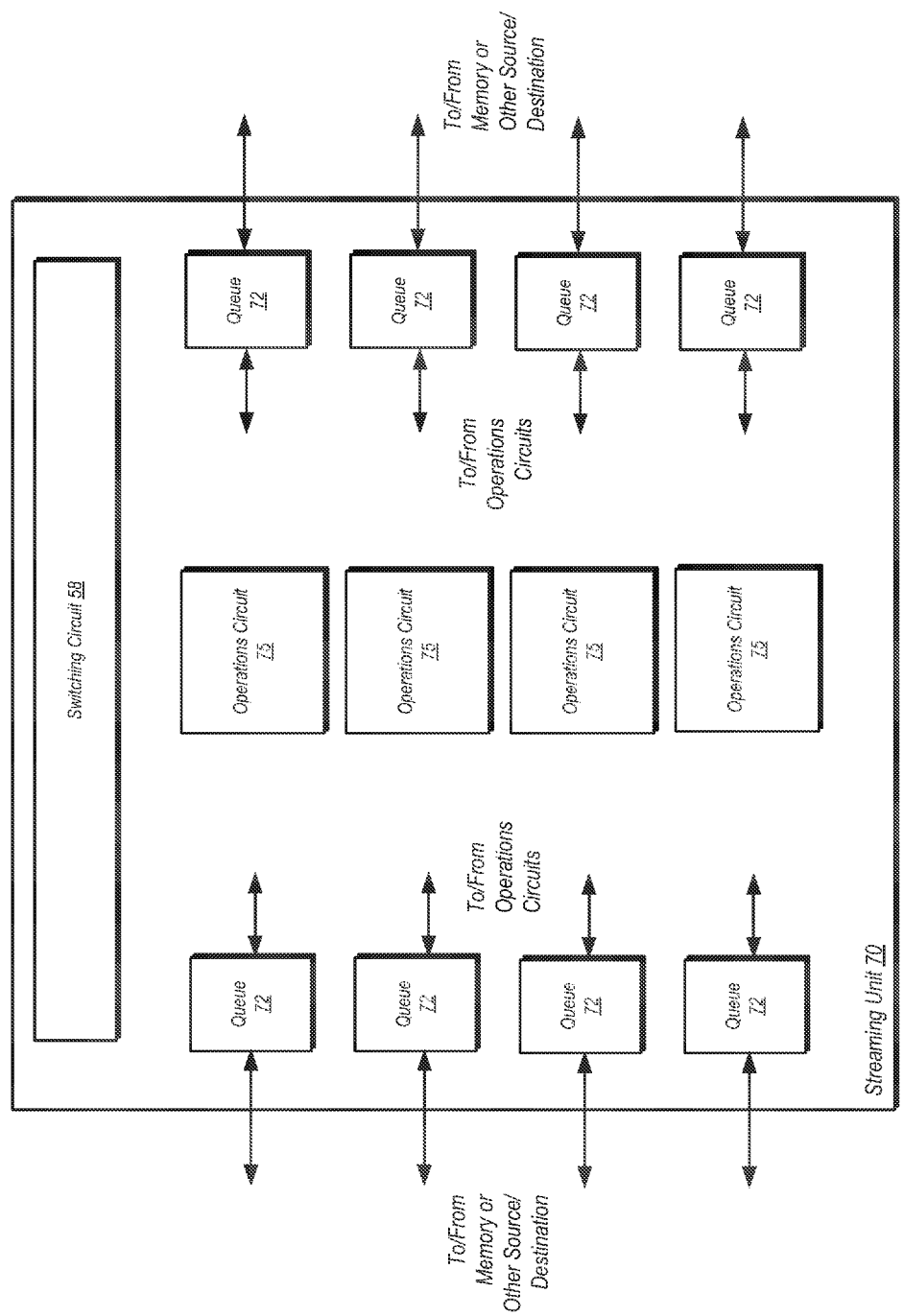
FIG. 7 is a block diagram of another embodiment of a streaming unit.

FIG. 7 is a block diagram of another embodiment of a streaming unit. In the embodiment shown, streaming unit 70 includes a number of queues 72, a number of operations circuit 75, and a switching circuit 58. The respective numbers of queues and operations circuits shown here are exemplary, and thus the number of each of these agents may vary from one embodiment to the next.

Streaming unit 70 differs from streaming unit 50 of FIG. 5 in different respects. In a first respect, the operations circuits 75 do not include input and output queues, in contrast to their counterparts in streaming unit 50. In a second respect, each of the queues 72 in streaming unit 70 is a general-purpose queue. That is, each of queues 72 may be used to interfacing streaming unit 70 to main memory 9, as a queue for coupling two operations circuit 75 together, for interfacing streaming unit 70 to other external agents, and so on. The various queues 72 and various operations circuit 75 may be coupled in various configurations by switching circuit 58, responsive to programming of the latter. The programming may also choose which queues are to be coupled to main memory and/or other agents external to streaming unit 70. Instructions having arguments as described above in reference to the embodiments of FIGS. 2 and 5 may be used by switching circuit 58 to configure streaming unit 70. In a third respect, only a single queue 72 is required to connect to operations circuits 75 to one another, and more generally, any two agents to one another (e.g., an operations circuit 75 to main memory). In addition, operations circuits 75 in some embodiments of streaming unit 70 may be capable of outputting multiple data streams.

FIGS. 8A-8D are block diagrams illustrating various programmable configurations of the streaming unit embodiment of FIG. 7. It is noted that only the units directly involved in the operations are shown in these various examples for the sake of simplicity. Other units in the streaming unit 70 may be performing other operations concurrently with the operations shown in these various drawings. It is further noted that while switching circuit 58 is not shown for the sake of simplicity, it is nonetheless present and the coupling of the units shown is assumed to have been performed thereby.

Figure 8A:
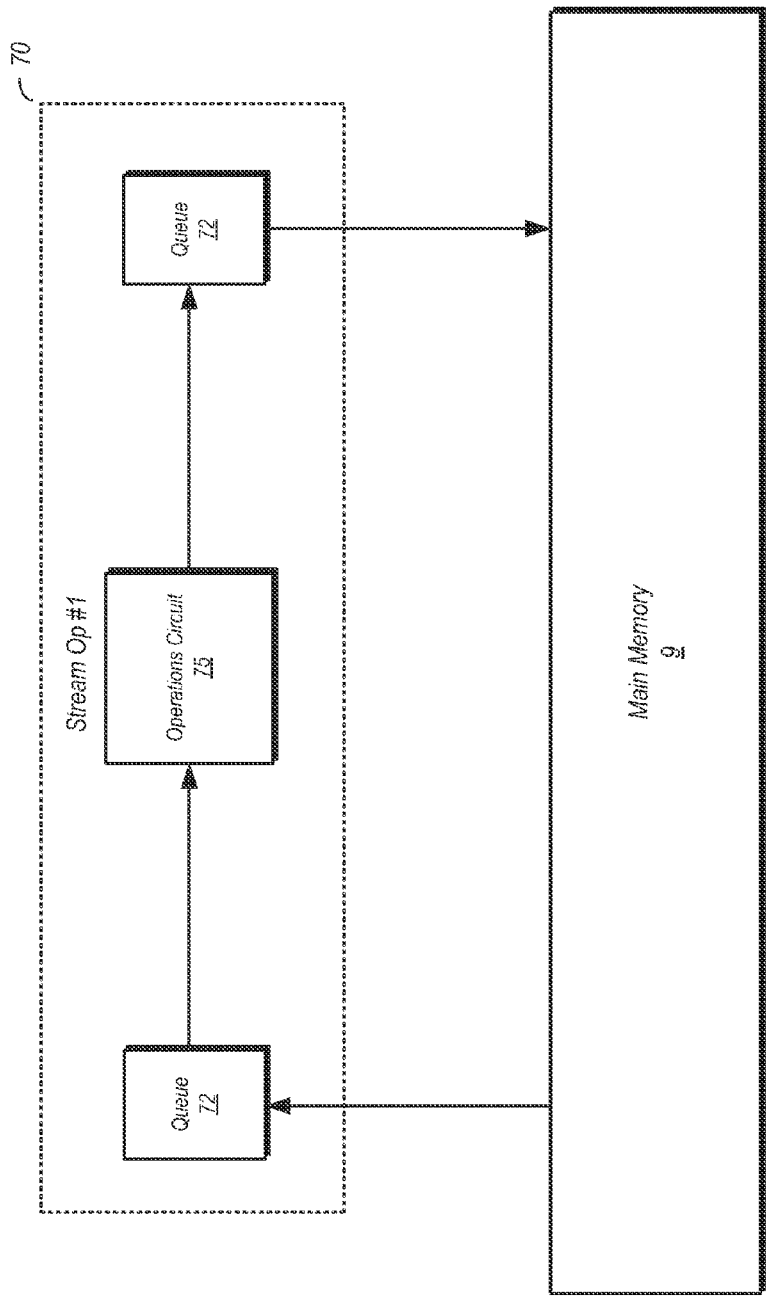
FIGS. 8A-8D are block diagrams illustrating various programmable configurations of the streaming unit embodiment of FIG. 7.

FIG. 8A illustrates a configuration for performing a simple operation, such as a move, copy, transformation, or other type. This operation is analogous to the operation performed in the example shown in FIG. 6A, but using streaming unit 70 instead of streaming unit 50. In the illustrated example, a data stream is loaded from main memory 9 to queue 72, and then to operations circuit 75. From operations circuit 75, a corresponding data stream (which may be identical in cases of move or copy operations) is forwarded to another queue 72, and then back to main memory.

Figure 8B:
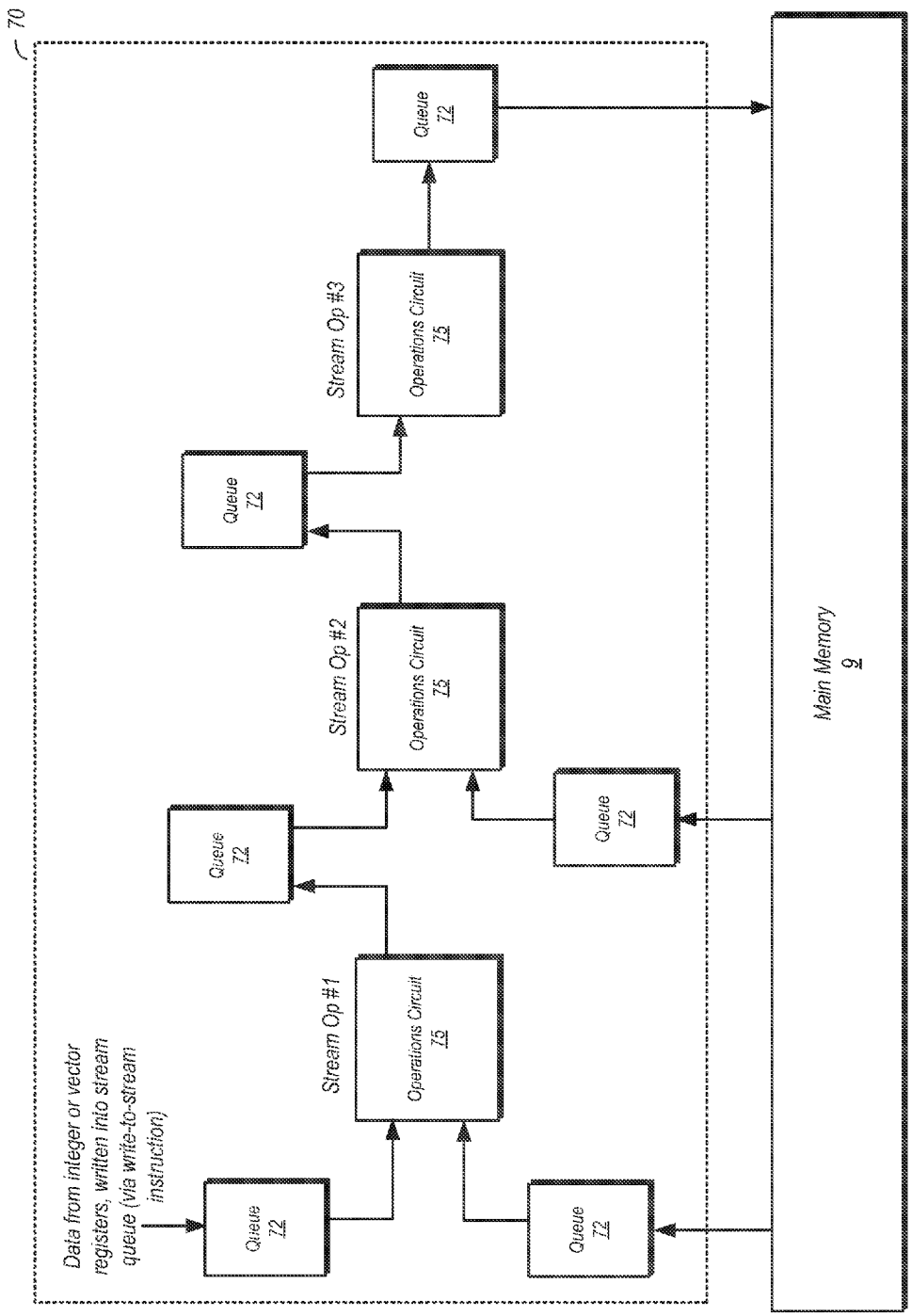

FIG. 8B illustrates another configuration for performing operations on multiple data streams, using multiple operations circuits. The operation performed by the configuration illustrated here is similar to that performed by the configuration shown in FIG. 6D. In the illustrated example, a first data stream is loaded into a first operations circuit, along with data from integer or vector registers, via respective queues 72. Using the data from the registers along with the data stream loaded from main memory 9, the first operations circuit 75 performs a first operation. The resulting data stream is output to a queue 72 coupled between the first and second operations circuits 75, and then conveyed to the latter. The second operations circuit also receives another data stream from main memory 9 via queue 72. The second operation uses these two data streams to generate another data stream, which is then passed to the third operations circuit 75 via another queue 72. The third operations circuit 75 then performs an operation on these data streams and generates a resulting output data stream, which is written back to main memory via a final queue 72.

Figure 8C:
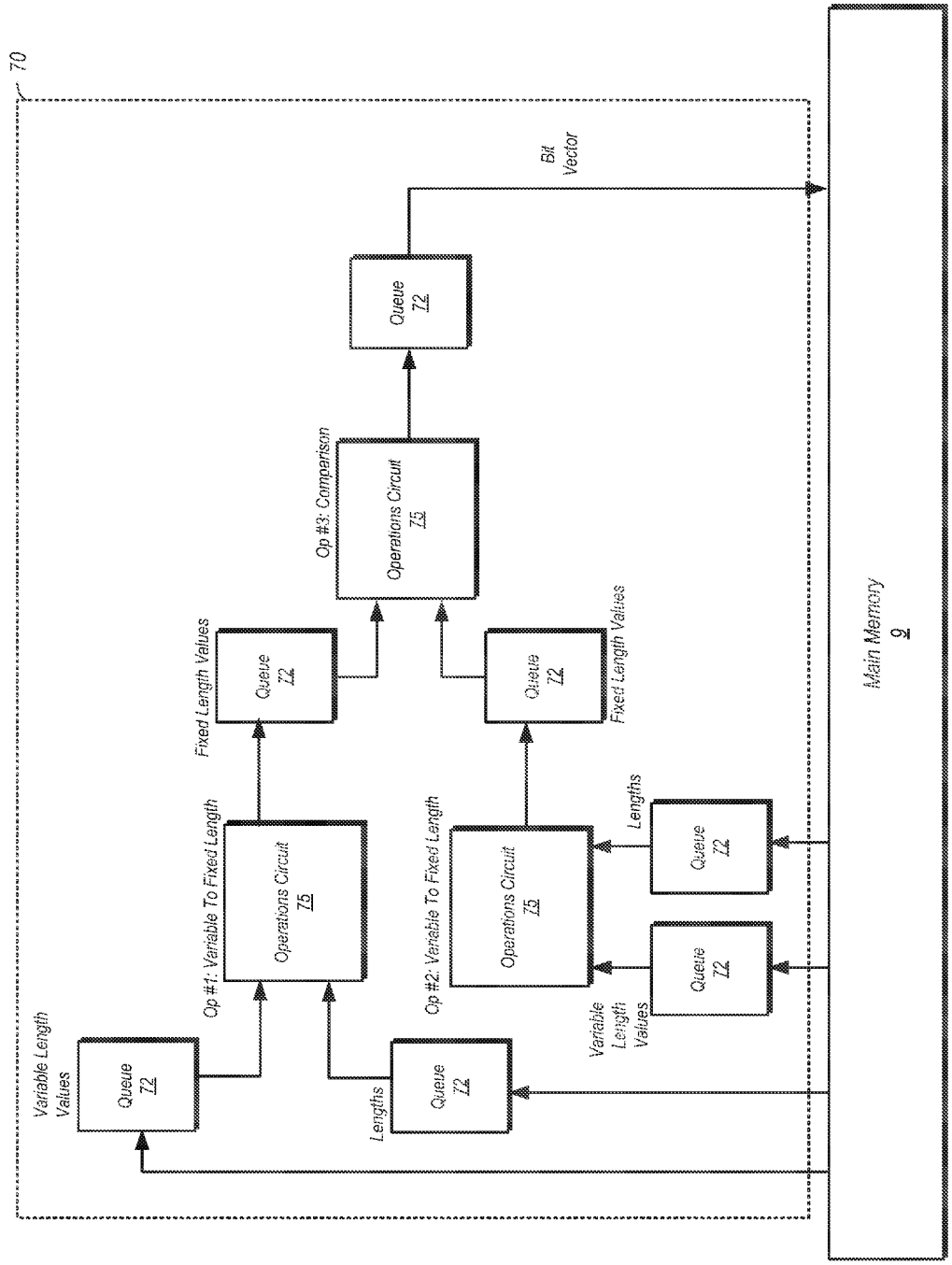

The arrangement shown in FIG. 8C is a series-parallel configuration in which four data streams are concurrently loaded from main memory 9. Each of the first and second operations circuits receives a data stream of variable length values and another data stream indicative of data lengths. Using the respectively received data streams, each of the first and second operations circuits 75 converts the variable length values into fixed length values. The two streams of fixed length values are then conveyed to a third operations circuit 75, via respective queues 72. The third operations circuit 75 performs a compare operation, and then outputs a bitstream of comparison results, via a final queue 72, to main memory.

Figure 8D:
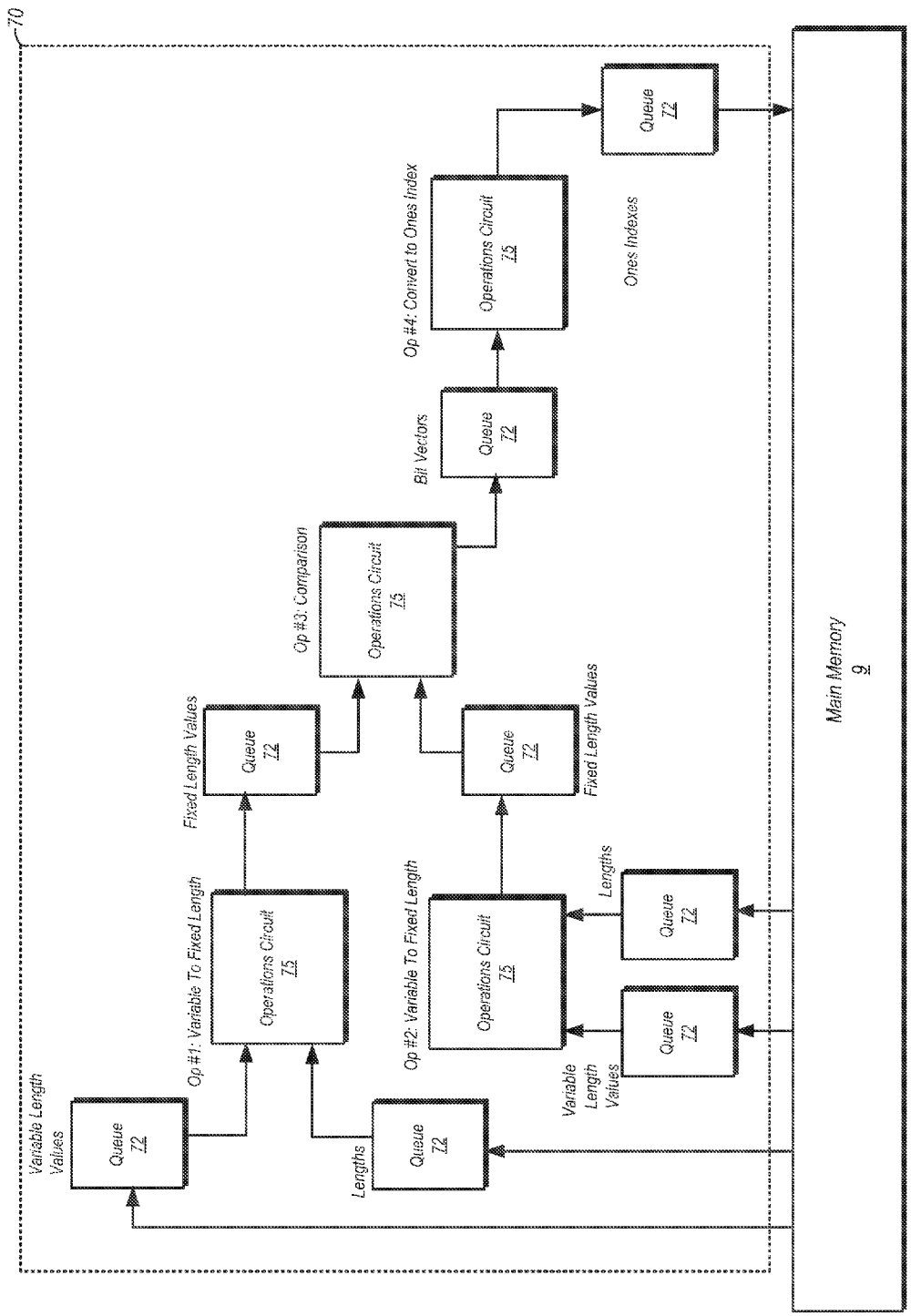

The configuration shown in FIG. 8D is analogous to the arrangement shown in FIG. 6F. The same types of data streams are concurrently loaded from memory, and the operations performed are of the same type and in the same order. The primary difference, as noted in the discussion of FIG. 7, is that the arrangement shown in FIG. 8D does not utilize input queues or output queues within the operations circuits, as operations circuits 75 do not include such queues. Instead, the selected queues 72 are used to perform the functions of linking various operations circuits 75 to one another.

The configurations discussed above in conjunction with FIGS. 8A-8D are exemplary, and various embodiments of streaming unit are by no means limited to only these configurations. In contrast, by programming the switching circuit 58 to configure the internal network of streaming unit 50 in various ways, a large number of different configurations are possible and contemplated.

Figure 9:
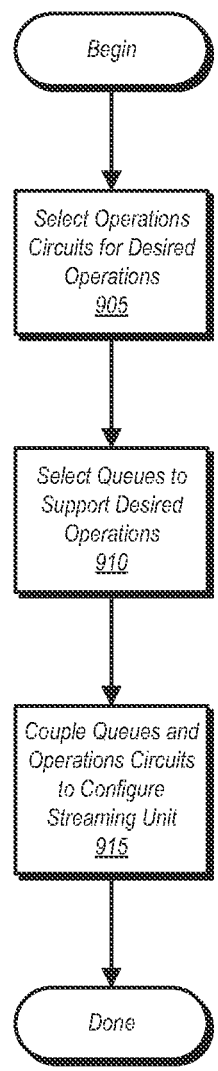
FIG. 9 is a flow diagram illustrating one embodiment of a method to program various embodiments of a programmable streaming unit.

FIG. 9 is a flow diagram illustrating one embodiment of a method to program one embodiment of a streaming unit. Method 900 may be implemented by either of the streaming unit embodiments shown in FIGS. 5 and 7, as well as variations thereof. Hardware embodiments not explicitly discussed herein that can implement method 900 are also possible and contemplated. It is further noted that the order of operations depicted in FIG. 9 is not limited to that of the specific embodiment illustrated.

Method 900 begins with the selecting of operations circuits for performing the desired operations (block 905). The selection may be performed by a switching circuit responsive to software programming of the streaming unit, and may include determining particular operations circuits to be selected as well as determining the order in which operations are to be performed. In some embodiments of a streaming unit, the operations circuits may be multi-functional, and thus the selecting of particular operations circuits may also include configuring those circuits to perform the desired operations. The queues needed to support the desired operations may also be selected by the switching circuit (block 910) responsive to the programming. The queues may include queues for receiving data from and/or conveying data to memory, as well as queues through which operations circuits are coupled to one another. After the operations circuit and queues have been selected, the switching circuit may couple them together in a configuration to enable the desired operations to be performed (block 915).

Figure 10:
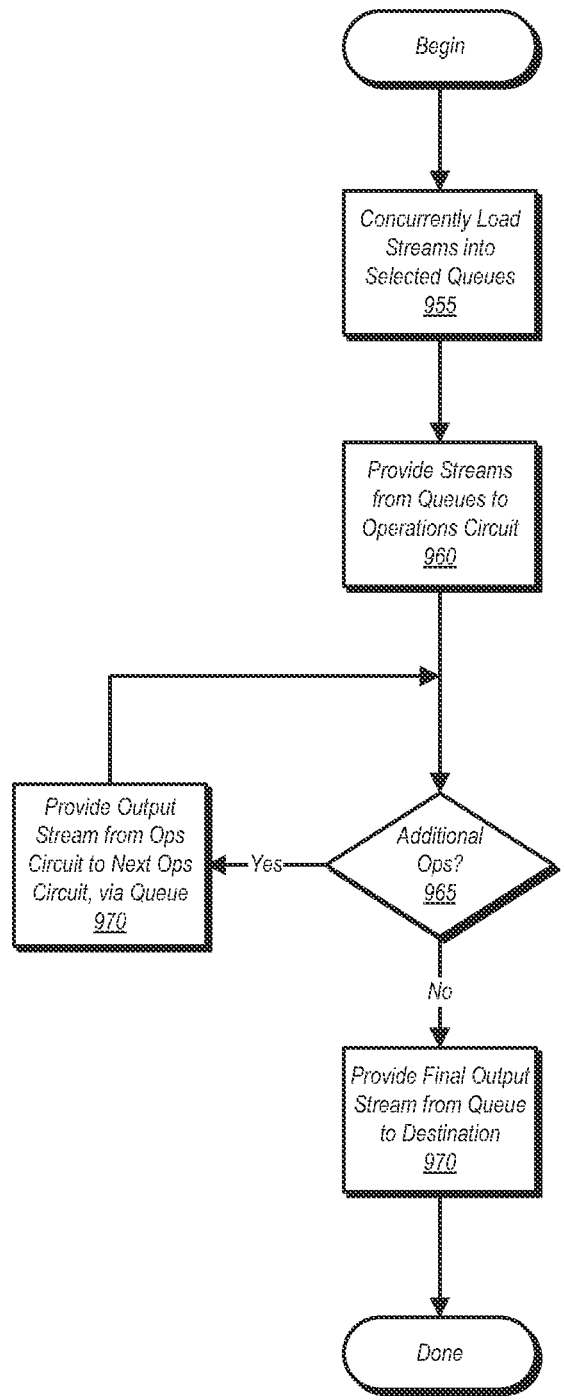
FIG. 10 is a flow diagram illustrating one embodiment of a method for operating various embodiments of a programmable streaming unit.

FIG. 10 is a flow diagram illustrating one embodiment of a method for operating an embodiment of a programmable streaming unit. Method 950 may be performed by either of the streaming unit embodiments shown in FIGS. 5 and 7, as well as variations thereof. Furthermore, embodiments of a streaming unit not explicitly discussed herein may also perform method 950. It is further noted that while method 950 is directed to a method that includes the concurrent loading of multiple streams from memory into a streaming unit, embodiments of a method utilizing only a single stream are also possible and contemplated. It is noted that the order of operations is not limited to the order shown in FIG. 10. Furthermore, while the method included concurrent loading of data streams, embodiments are possible and contemplated in which sequential loading of data streams is performed. Furthermore, the operations may overlap in some cases. For example, while data from a stream is being loaded into a selected queue, previously loaded data may concurrently be provided to an operations circuit, while data previously provided to an operations circuit may be processed therein concurrent with the previously mentioned actions.

Method 950 begins with the concurrent loading of streams from memory into selected queues (block 955). The data from the streams may then be conveyed from their respective queues to at least one operations circuit (block 960). In some cases, data may be conveyed to two or more operations circuits operating in parallel. Furthermore, a given operations circuit may receive a single stream or multiple streams. The operations may be any of the operations discussed above, as well as a wide variety of operations not implicitly or explicitly discussed herein.

If there are additional operations to be performed (block 965, yes), then an output stream is provided from each operations circuit that performed operations on an initially loaded data stream and forwarded to another operation circuit, via a queue (block 970). This loop may repeat as long as there are additional operations to be performed. If there are no additional operations to be performed (block 965, no), then the final output stream is provided from the last operations circuit, via a queue, to its destination (block 970). The destination may be back to memory, to one or more execution units, to various types of register, and so on.

Numerous variations and modifications will become apparent to those skilled in the art once the above disclosure is fully appreciated. It is intended that the following claims be interpreted to embrace all such variations and modifications.

What is claimed is:

1. A processor comprising:
one or more execution units configured to execute instructions of a processor instruction set; and
a streaming unit configured to execute a first instruction of the processor instruction set, wherein executing the first instruction comprises the streaming unit loading a first data stream from a memory of a computer system responsive to execution of a first instruction, the first data stream comprising a plurality of data elements, wherein the first instruction includes a first argument indicating a starting address of the first stream and a second argument indicative of an ending address of the first stream;
wherein the streaming unit is configured to output a second data stream corresponding to the first data stream.

2. The processor as recited in claim 1, wherein the streaming unit is coupled to provide the second data stream to at least one of the one or more execution units.

3. The processor as recited in claim 2, wherein the second data stream is identical to the first data stream.

4. The processor as recited in claim 1, wherein the streaming unit is further configured to write the second data stream back to memory independent of intervention by any of the one or more execution units.

5. The processor as recited in claim 1, wherein the first instruction further includes:
a third argument indicative of a stride between each of the plurality of data elements;
a fourth argument indicative of a size of each of the plurality of data elements; and
a fifth argument indicative of a destination for the second data stream.

6. The processor as recited in claim 1, wherein the streaming unit includes one or more transformation circuits, wherein a designated one of the one or more transformation circuits is configured to produce the second data stream by performing a transformation on the first data stream.

7. The processor as recited in claim 1, wherein the streaming unit includes one or more logic units configured to produce the second data stream by performing logical operations on the first data stream.

8. The processor as recited in claim 1, wherein the streaming unit is configured to:
concurrently load two or more streams from memory independent of one another; and
concurrently store two or more streams to memory independent of one another.

9. A method comprising:
loading a first data stream from a memory of a computer system responsive to execution of a first instruction by a streaming unit in a processor of the computer system, wherein the first instruction includes a first argument indicating a starting address of the first stream, a second argument indicating a stride between the data elements, and a third argument indicative of an ending address of the stream;
outputting a second data stream from the streaming unit, the second data stream corresponding to the first data stream.

10. The method as recited in claim 9, further comprising outputting the second data stream to at least one of one or more execution units of a processor.

11. The method as recited in claim 10, wherein the second data stream is identical to the first data stream.

12. The method as recited in claim 9, further comprising writing the second data stream back to memory independent of any intervention by one or more execution units of the processor.

13. The method as recited in claim 9, wherein the first instruction further includes a fourth argument indicative of a destination for the second data stream.

14. The method as recited in claim 9, further comprising transforming the first data stream in a transformation circuit of the streaming unit to produce the second data stream.

15. The method as recited in claim 9, further comprising producing the second data stream in by performing logical operations, in a logic unit of the streaming unit, on the first data stream.

16. The method as recited in claim 9, further comprising:
concurrently loading, using the streaming unit, two or more data streams from memory independent of one another; and
concurrently storing, using the streaming unit, write two or more data streams to memory independent of one another.

17. A processor comprising:
one or more execution units configured to execute instructions of a processor instruction set; and
a streaming unit configured to load a first data stream from memory responsive to execution of a first instruction including a first argument wherein the first instruction includes a first argument indicating a starting address of the first stream, a second argument indicating a stride between the data elements, a third argument indicative of an ending address of the stream, and a fourth argument indicating a destination of a second data stream output from the streaming unit, the second data stream corresponding to the first data stream;
wherein the streaming unit is configured output the second data stream to at least one of the one or more execution units responsive to the fourth argument having a first value, and wherein the streaming unit is configured to store the second data stream to the memory, independent of any intervention by the one or more execution units, responsive to the fourth argument having a second value.

18. The processor as recited in claim 17, wherein the streaming unit is further configured to:
concurrently load two or more data streams from memory independent of one another; and
concurrently store two or more data streams to memory independent of one another.

19. The processor as recited in claim 17, wherein the streaming unit is further configured to load and store data streams independent of a cache hierarchy in the processor.

20. The processor as recited in claim 17, wherein the streaming unit includes at least one logic circuit, wherein the logic circuit is configured to produce the second data stream by performing a logic function on the first data stream.

* * * * *

UNITED STATES PATENT AND TRADEMARK OFFICE
CERTIFICATE OF CORRECTION

PATENT NO. : 9,043,510 B2
APPLICATION NO. : 13/960235
DATED : May 26, 2015
INVENTOR(S) : Gove et al.

It is certified that error appears in the above-identified patent and that said Letters Patent is hereby corrected as shown below:

In the specification

Column 8, line 32, delete "'1' s" and insert -- '1's --, therefor.

In the claims

Column 13, line 15, Claim 10, delete "of one" and insert -- of the one --, therefor.

Column 13, line 30, Claim 15, after "stream" delete "in".

Signed and Sealed this
Ninth Day of February, 2016

Michelle K. Lee
*Director of the United States Patent and Trademark Office*